US009275286B2

(12) United States Patent
Bulan et al.

(10) Patent No.: US 9,275,286 B2
(45) Date of Patent: Mar. 1, 2016

(54) SHORT-TIME STOPPING DETECTION FROM RED LIGHT CAMERA VIDEOS

(71) Applicant: Xerox Corporation, Norwalk, CT (US)

(72) Inventors: Orhan Bulan, Henrietta, NY (US); Aaron M. Burry, Ontario, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/278,218

(22) Filed: May 15, 2014

(65) Prior Publication Data
US 2015/0332097 A1    Nov. 19, 2015

(51) Int. Cl.
*G06K 9/00* (2006.01)
*G06T 7/20* (2006.01)
*G06K 9/46* (2006.01)
*G06K 9/62* (2006.01)
*G06T 7/00* (2006.01)

(52) U.S. Cl.
CPC .......... *G06K 9/00771* (2013.01); *G06K 9/4652* (2013.01); *G06K 9/6267* (2013.01); *G06T 7/0081* (2013.01); *G06T 7/2033* (2013.01); *G06T 2207/10016* (2013.01); *G06T 2207/10024* (2013.01); *G06T 2207/20144* (2013.01); *G06T 2207/30232* (2013.01); *G06T 2207/30236* (2013.01); *G06T 2207/30241* (2013.01)

(58) Field of Classification Search
CPC .................................................. G08G 1/0175
See application file for complete search history.

(56) References Cited

U.S. PATENT DOCUMENTS

| | | | | |
|---|---|---|---|---|
| 6,970,102 | B2* | 11/2005 | Ciolli | 340/933 |
| 8,970,701 | B2* | 3/2015 | Lao | 348/149 |
| 2010/0322476 | A1* | 12/2010 | Kanhere et al. | 382/103 |
| 2011/0182473 | A1* | 7/2011 | Wang | 382/103 |
| 2012/0134532 | A1* | 5/2012 | Ni et al. | 382/103 |
| 2012/0249795 | A1* | 10/2012 | Ito | 348/148 |
| 2012/0262579 | A1* | 10/2012 | Chen et al. | 348/148 |
| 2013/0027704 | A1* | 1/2013 | Davis | 356/402 |

OTHER PUBLICATIONS

Chiang et al., "Detecting and recognizing traffic lights by genetic approximate ellipse detection and spatial texture layouts", International Journal of Innovative Computing, Information and Control, vol. 7, No. 12, Dec. 2011.*
Franke et al., "Autonomous driving approaches downtown", IEEE Intelligent systems, vol. 13, No. 6, 1999.*
U.S. Appl. No. 14/278,196, entitled "Short-Time Stopping Detection From Red Light Camera Evidentiary Photos," filed May 15, 2014, by Orhan Bulan, et al.

* cited by examiner

*Primary Examiner* — Soo Park
(74) *Attorney, Agent, or Firm* — Fay Sharpe LLP (57) ABSTRACT

A method for detecting a vehicle running a stop signal positioned at an intersection includes acquiring a sequence of frames from at least one video camera monitoring an intersection being signaled by the stop signal. The method includes defining a first region of interest (ROI) including a road region located before the intersection on the image plane. The method includes searching the first ROI for a candidate violating vehicle. In response to detecting the candidate violating vehicle, the method includes tracking at least one trajectory of the detected candidate violating vehicle across a number of frames. The method includes classifying the candidate violating vehicle as belonging to one of a violating vehicle and a non-violating vehicle based on the at least one trajectory.

18 Claims, 8 Drawing Sheets

SHORT-TIME STOPPING DETECTION FROM RED LIGHT CAMERA VIDEOS

BACKGROUND

The present disclosure relates to a vision-based system and method for making a traffic regulation violation decision regarding vehicle activity during a stop light signal. The system automatically processes video data to discriminate between violating vehicles that run a red light and/or stop signal and non-violating vehicles that stop. However, the present disclosure is amenable to other like applications.

Red Light Camera Systems (RLCS) are traffic regulation enforcement systems that detect and identify vehicles that enter an intersection against a red traffic light and, therefore, are in violation of a traffic regulation. These systems can identify the violating vehicles by recognizing license plate numbers and/or the make and model of the vehicles from photographs captured by red light cameras. A citation is then issued to the owner of the vehicle identified in a photograph.

Figure 1:
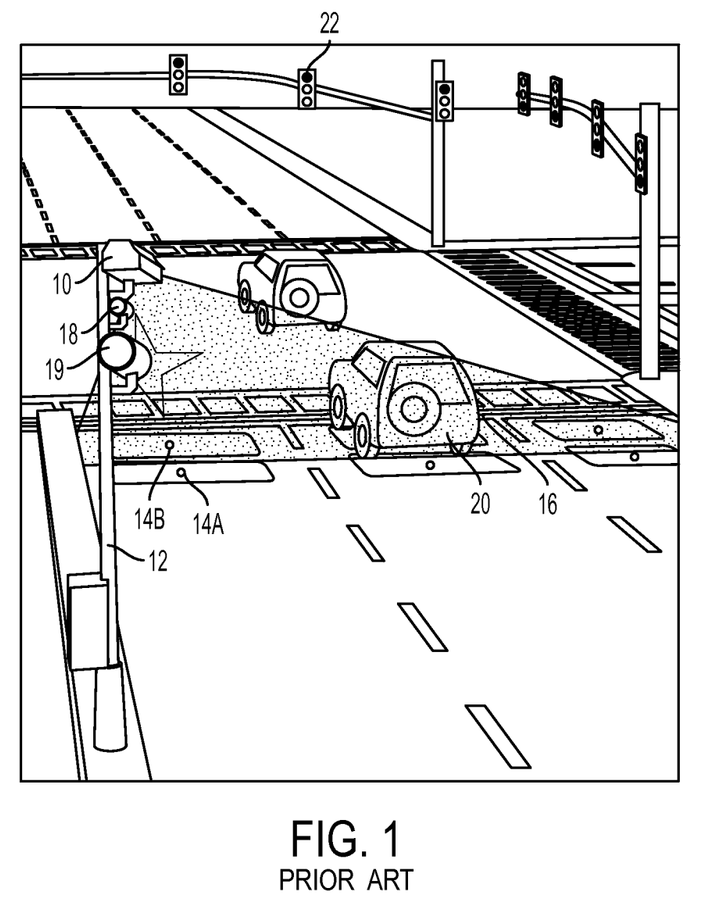
FIG. 1 shows how an existing RCLS system operates in the PRIOR ART.

In more specific detail, FIG. 1 shows how an existing RLCS system operates in the PRIOR ART. A still image enforcement camera 10, and video camera 18, and an illumination source 19 are attached to a pole 12 at an intersection. To measure vehicle speed, two closely spaced induction loops ("sensors 14A, 14B") are embedded in the pavement near the stop line 16. When a vehicle activates both sensors within a predetermined time threshold, the sensors trigger the cameras 10, 18 to capture the event as a series of photographs or a video clip that shows the vehicle 20 as it enters and proceeds through the intersection on a red light signal 22.

Existing systems generate a number of false detections, which can result in the issuance of erroneous tickets. These false detections mainly result from vehicles that abruptly stop at the stop line after triggering the sensors 14A, 14B within the predetermined time threshold. These systems furthermore require that a law enforcement official manually review the photographs and video clips to determine if a violation occurred. Given that a significant number of the violations are rejected as false detections, this time consuming manual review task is currently very inefficient.

An improved system and method is desired which automatically detects non-violating vehicles, which are falsely identified as violating vehicles in the existing system. A system and method are desired which discriminates between violators and non-violators using video data.

INCORPORATION BY REFERENCE

The disclosure of co-pending and commonly assigned U.S. Patent Application No. 14/278,196 (now Publication No. US-2015-0332588-A1), entitled "Short-Time Stopping Detection From Red Light Camera Evidentiary Photos," filed May 15, 2014 by, Orhan Bulan, et al., the content of which is totally incorporated herein by reference.

BRIEF DESCRIPTION

A first embodiment of the disclosure relates to a method for detecting a vehicle running a stop signal positioned at an intersection. The method includes acquiring a sequence of frames from at least one video camera monitoring an intersection being signaled by the stop signal. The method includes defining a first region of interest (ROI) including a road region located before the intersection on the image plane. The method includes searching the first ROI for a candidate violating vehicle. In response to detecting the candidate violating vehicle, the method includes tracking at least one trajectory of the detected candidate violating vehicle across a number of frames. The method includes classifying the candidate violating vehicle as belonging to one of a violating vehicle and a non-violating vehicle based on the at least one trajectory.

Another embodiment of the disclosure relates to a system for detecting a vehicle running a stop signal positioned at an intersection. The system comprising a traffic regulation enforcement device including a memory and a processor in communication with the memory. The processor is configured to acquire a sequence of frames from at least one video camera monitoring an intersection being signaled by the stop. The processor is further configured to define a first region of interest (ROI) including a road region located before the intersection on the image plane and search the first ROI for a candidate violating vehicle. In response to detecting the candidate violating vehicle, the processor is configured to track at least one trajectory of the detected candidate violating vehicle. The processor is configured to classify the candidate violating vehicle as belonging to one of a violating vehicle and a non-violating vehicle based on the at least one trajectory.

DETAILED DESCRIPTION

The present disclosure relates to a vision-based system and method for discriminating between violating vehicles that run a stop signal and non-violating vehicles. Mainly, any vehicle that is detected in motion in the first ROI by a video camera monitoring the intersection-of-interest is treated by the system as a candidate violator. The present system automatically processes the video data to make a violation decision regarding the candidate violating vehicle.

Figure 2:
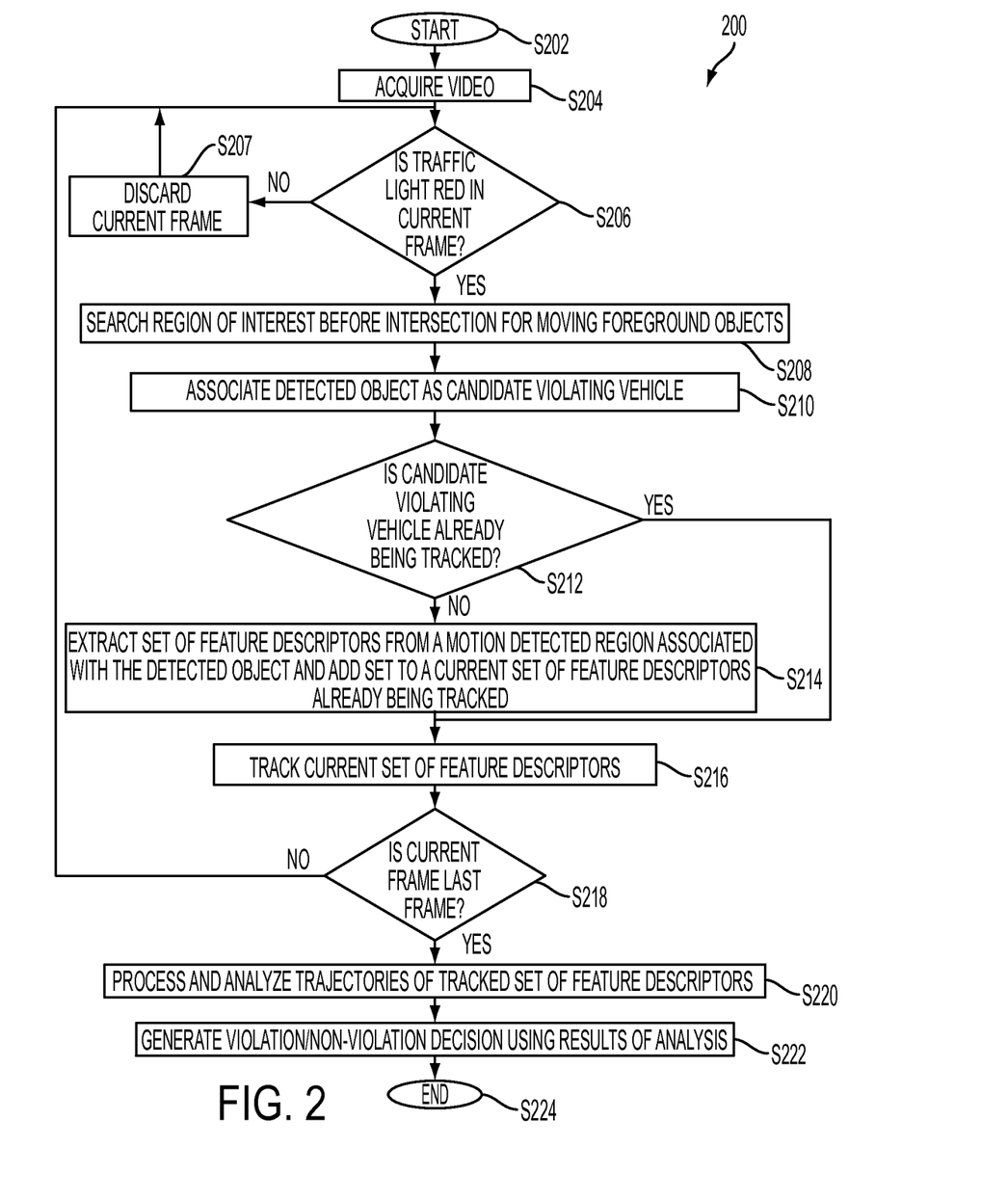
FIG. 2 is an overview of the present method.

An overview of the present method 200 is shown in FIG. 2. The method starts at S202. The system acquires the video at S204, generally of an intersection being guided by a stop signal. For illustrative purposes, the term "stop signal" herein mainly refers to a traffic light, such as a conventional red light having multiple signal lamps each displaying a different color for notifying drivers when to stop, use caution, and go. There is furthermore, no limitation made to the term "intersection", as the embodiments disclosed herein are amenable to any application making a violation decision when a vehicle proceeds to travel through a regulated region of interest, such as a yield-controlled, stop-controlled, or signal-controlled intersection, or intersections controlled by flashing beacons, all of which are generally regulated to reduce a risk of vehicular accidents, etc. Furthermore, the embodiments disclosed herein are also amenable to any application making a violation decision when a pedestrian proceeds to travel through a pedestrian signal at a crosswalk.

Generally, the video data is taken in relation to when a vehicle triggers a sensor embedded in the road, and the video assumes to capture the vehicle just before an intersection and at the intersection. Therefore, the sensor can include an induction loop that, in response to being triggered, initiates an operation of the video camera 18 in real time or near real-time, to capture video of the violating vehicle proximate the intersection. The video may be taken as additional evidence in support of a violation discrimination based on induction loops signals. Alternatively, the video make be taken for the express purpose of red light violation discrimination, or for other purposes. The video data can include isolated image frames from a temporal video sequence. Alternatively, video may be taken with a camera designed for still image capture. The system determines the state of the traffic light at each frame in the video sequence at S206. In response to the traffic light not being red (NO at S206), the system discards the current frame at S207 and proceeds to repeat the process starting at S206 for the next frame in the sequence. In response to the traffic light being red (YES at S206), the system searches for moving objects in a defined region of interest $ROI_B$ located before the intersection on the image plane at S208. The system can associate the moving object as a candidate violating vehicle at S210. The system determines if the candidate violating vehicle is already being tracked at S212. If the candidate violating vehicle is a newly detected candidate (NO at S212), the system extracts a set of attributes/features from the motion detected region associated with the candidate violating vehicle. The extracted set of attributes/features is added to the pool/set of attributes/features already being tracked at S214. The features/attributes in the pool/set are tracked at S216.

If the candidate violating vehicle is a currently tracked candidate (YES at S212), the system tracks the extracted attributes/features across the subsequent frames at S216. At S218, the system determines whether the current frame is the last frame. The "last frame" is not limiting for purposes of this disclosure, and can include the final frame at the end of a video clip, a frame corresponding to when the vehicle is detected beyond a certain point, and a frame associated with when a fixed amount of time passes after a starting frame, etc. In response to the current frame not being the last frame (NO at S218), the system proceeds to repeat the process starting at S206 for the next frame in the sequence. In response to the current frame being the last frame (YES at S218), the system processes and analyzes the tracked attributes/features at S220. Using the trajectories and the analysis information, the system makes a violation/non-violation decision at S222, which classifies the candidate violating vehicle as belonging to one of a violating vehicle and non-violating vehicle. The method ends at S224.

Figure 3:
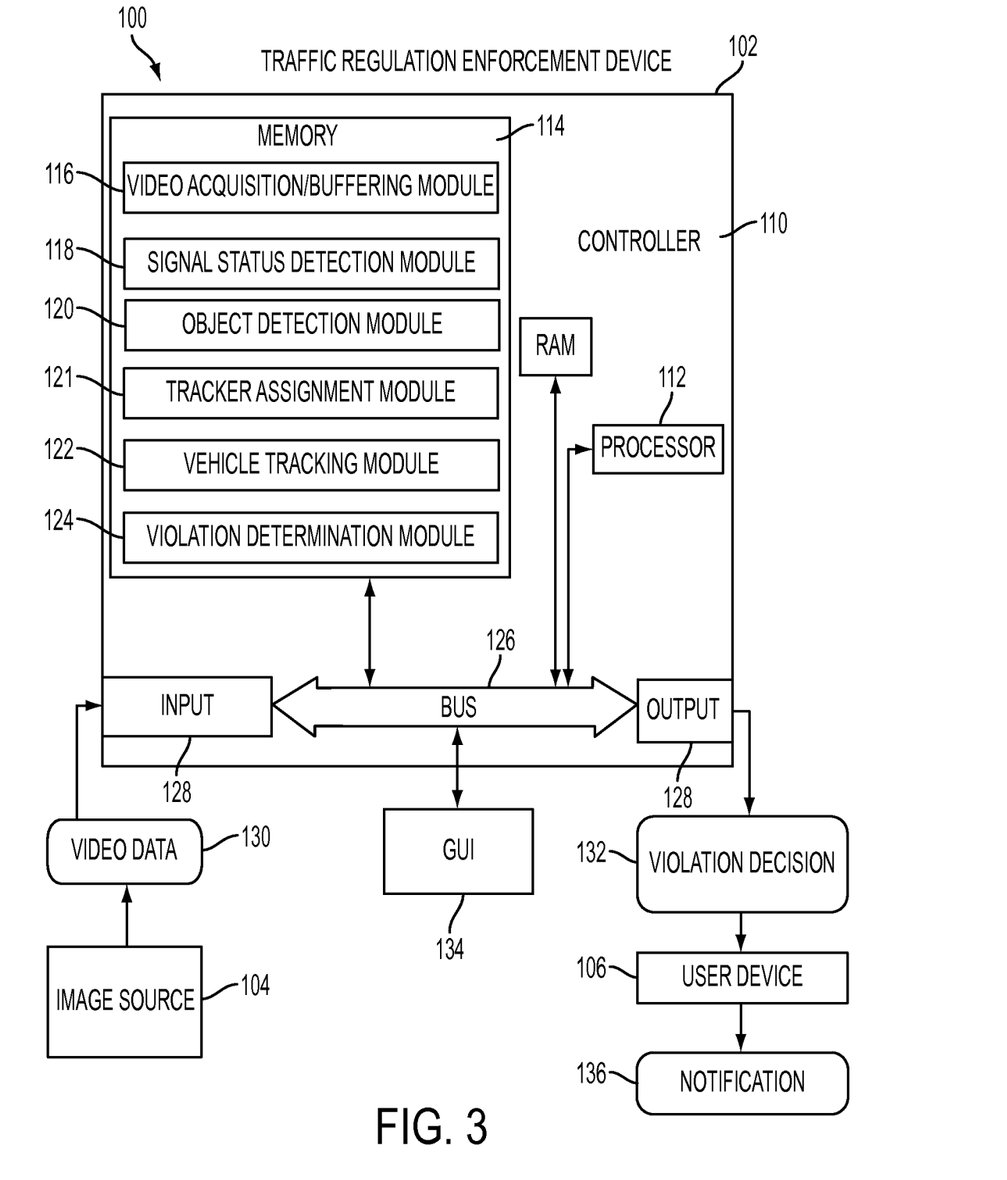
FIG. 3 is a schematic illustration of a vision-based system for making a traffic regulation violation decision regarding a vehicle running a stop light.

FIG. 3 is a schematic illustration of a vision-based system 100 for making a traffic regulation violation decision regarding a vehicle running a stop light. The system 100 includes a traffic regulation enforcement device 102 and an image source 104—which may be incorporated in a conventional RLCS—linked together by communication links, referred to herein as a network. In one embodiment, the system 100 may be in further communication with a user device 106. These components are described in greater detail below.

The traffic regulation enforcement device 102 illustrated in FIG. 3 includes a controller 110 that is part of or associated with the device 102. The exemplary controller 110 is adapted for controlling an analysis of image data received by the system 100. The controller 110 includes a processor 112, which controls the overall operation of the device 102 by execution of processing instructions that are stored in memory 114 connected to the processor 112.

Figure 4A:
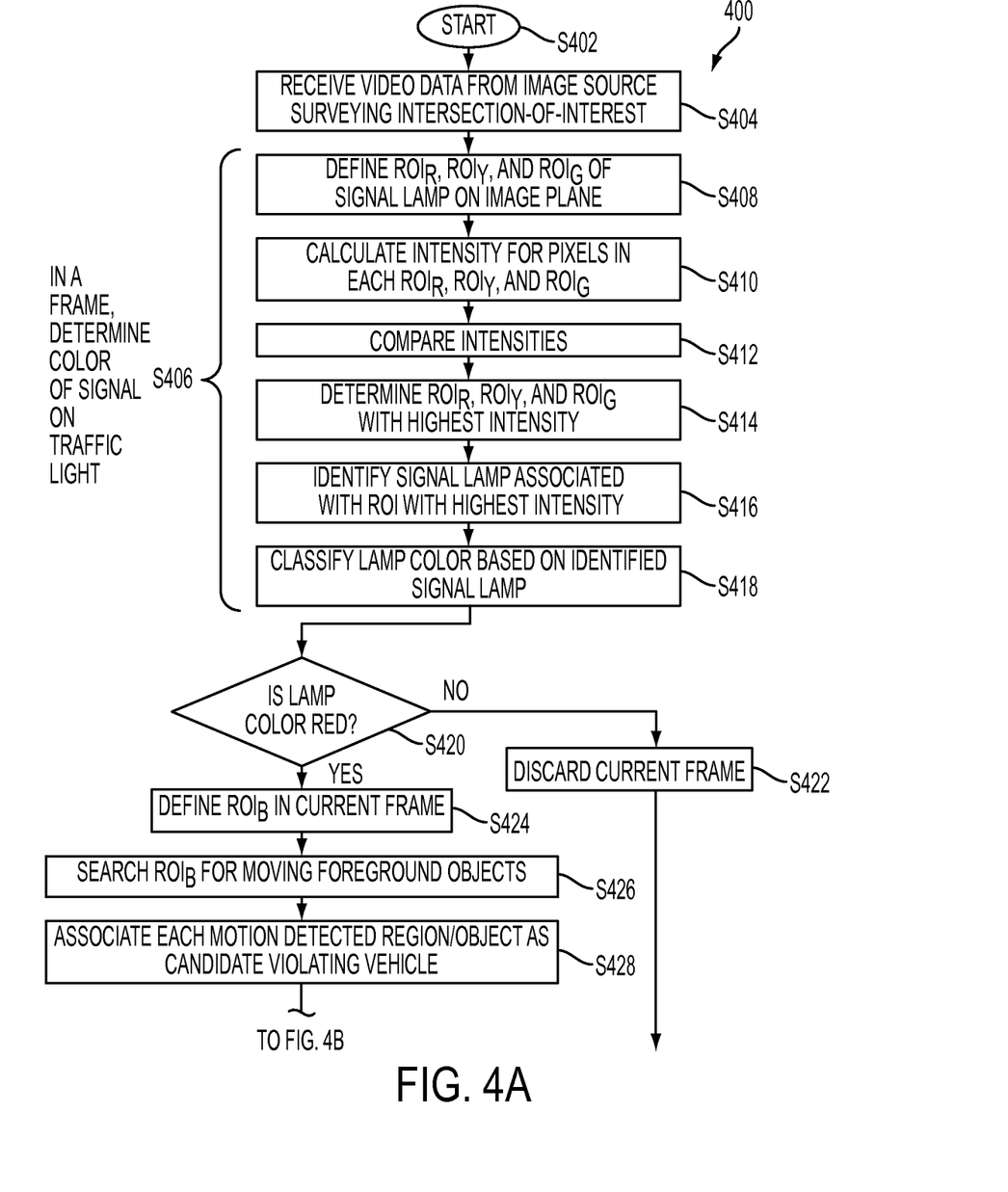
FIG. 4A-B is a flowchart describing a method for making a traffic regulation violation decision regarding vehicle activity during a stop light.
Figure 4B:
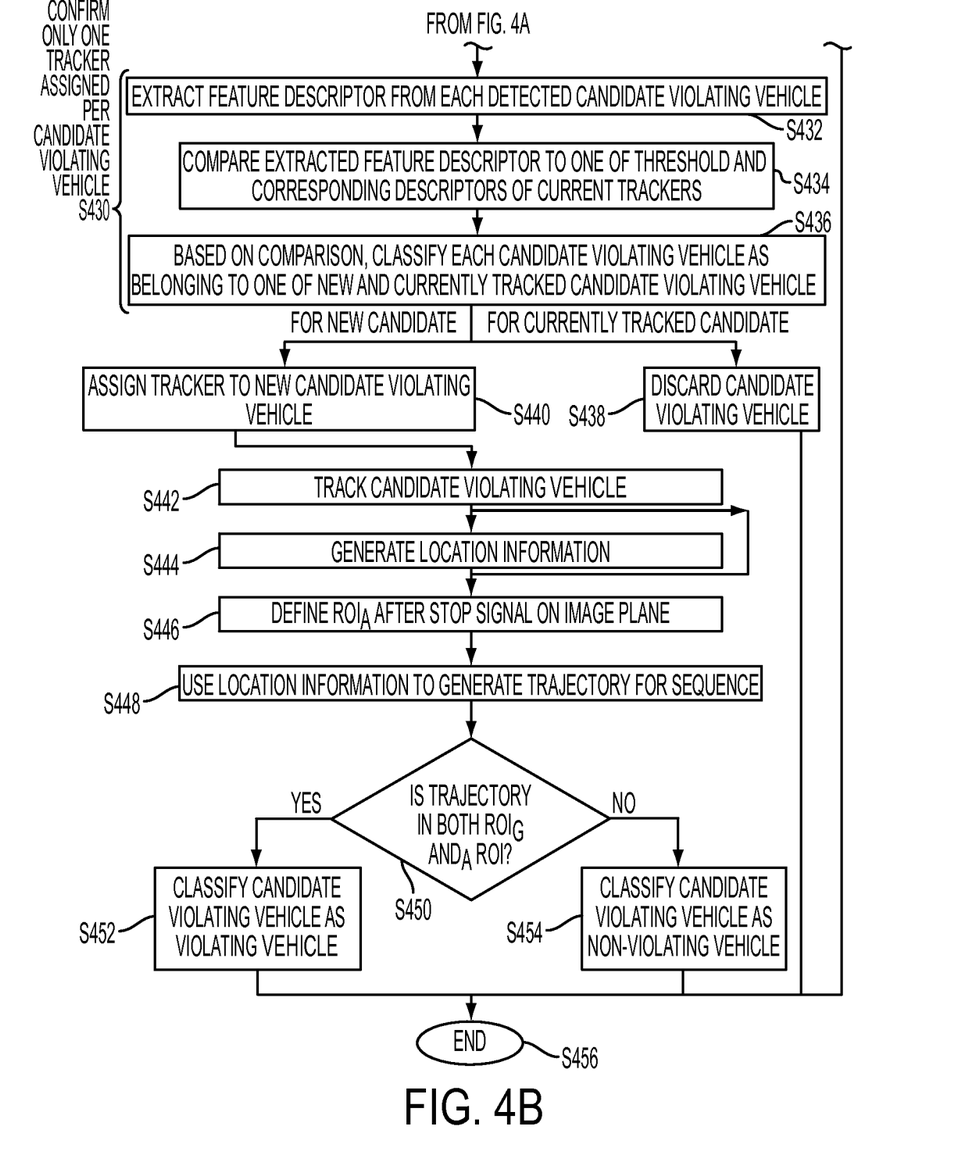

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 114 for performing the parts of the method outlined in FIGS. 2 and 4. In some embodiments, the processor 112 and memory 114 may be combined in a single chip.

The device 102 may be embodied in a networked device, such as the image source 104, although it is also contemplated that the device 102 may be located elsewhere on a network to which the system 100 is connected, such as on a central server, a networked computer, or the like, or distributed throughout the network or otherwise accessible thereto. In other words, the processing can be performed within the image capture device 104 on site or in a central processing offline or server computer after transferring the evidentiary images through a network. In one embodiment, the image source 104 can be a device adapted to relay and/or transmit the images to the device 102. In another embodiment, the image data 130 may be input from any suitable source, such as a workstation, a database, a memory storage device, such as a disk, or the like. The image source 104 is in communication with the controller 110 containing the processor 112 and memories 114.

The stages disclosed herein are performed by the processor 112 according to the instructions contained in the memory 114. In particular, the memory 114 stores an image buffering module 116, which receives video data of a first area before an intersection and a second area after an intersection; a signal status detection module 118, which detects the current state of the traffic signal lights in each frame; an object detection module 120, which detects candidate violating vehicles in a region of interest (ROI) defined on the image plane; a tracker assignment module 121, which extracts features/attributes for each candidate vehicle and associates the extracted features with a tracker; a vehicle tracking module 122, which tracks the location of each detected candidate violating vehicle across the frames using the extracted features/attributes; and, a violation determination module 124, which determines if the candidate violating vehicle is in violation of running the intersection in lieu of a stop light using the tracking data. Embodiments are contemplated wherein these instructions can be stored in a single module or as multiple modules embodied in different devices. The modules 116-124 will be later described with reference to the exemplary method.

The software modules as used herein, are intended to encompass any collection or set of instructions executable by the device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 102 may be all connected by a bus 126.

With continued reference to FIG. 3, the device 102 also includes one or more communication interfaces 128, such as network interfaces, for communicating with external devices. The communication interfaces 128 may include, for example, a modem, a router, a cable, and and/or Ethernet port, etc. The communication interfaces 128 are adapted to receive the images ("image data 130") as input.

The device 102 may include one or more special purpose or general purpose computing devices, such as a server computer, controller, or any other computing device capable of executing instructions for performing the exemplary method.

FIG. 3 further illustrates the device 102 connected to an image source 104 for acquiring and/or providing the video (or image frame) data in electronic format. The image source 104 (hereinafter "video camera 104) may include one or more surveillance cameras that capture video from the scene of interest. The number of cameras may vary depending on a length and location of the area being monitored. It is contemplated that the combined field of view of multiple cameras typically comprehends the entire area surrounding the intersection at least in the road direction. For performing the method at night, the video camera 104 can include RGB or near infrared (NIR) capabilities coupled with an external illuminator [unnumbered] as shown in FIG. 1. In one contemplated embodiment, the video camera 104 is a high resolution camera to enable the identification of violating vehicles through processes such as automatic license plate recognition (ALPR), etc. In other embodiments, a high resolution image of the license plate is taken with a separate still image enforcement camera, shown as 10 in FIG. 1, operating in conjunction with video camera 104.

With continued reference to FIG. 3, the video data 130 undergoes processing by the traffic regulation enforcement device 102 to output a violation decision 132.

Furthermore, the system 100 can display the violation decision and/or output in a suitable form on a graphic user interface (GUI) 134. The GUI 134 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112. Alternatively, the device 102 can provide the violation decision to the output device 106, which can display the decision to a user, such as a traffic enforcement officer, or a notification 136 to the authority in charge of issuing citations. Furthermore, in one contemplated embodiment, the violation decision can be transmitted to another computer application, which can perform additional processing on the image to identify owners of any violating vehicle for the purpose of issuing citations.

FIG. 4A-B is a flowchart describing a method 400 for making a traffic regulation violation decision regarding vehicle activity during a stop light. The method starts at S402

At S404, the image buffering module 116 acquires video captured from the RLCS. As mentioned supra, the RLCS operates to capture video of an intersection at least during a stop/red signal light. The RLCS can employ an in-ground induction loop having sensors that trigger a video camera 104 to capture video of vehicle activity in the scene of interest. However, embodiments are contemplated whereby the module 116 acquires the video data from a video camera 104, which is in communication with a traffic light controller such that it captures video of the scene (e.g., intersection) of interest during the periods that traffic light is red. In yet another embodiment, the module 116 can acquire video data from a video camera that is operating continuously/discontinuously to capture the video in response to user input and/or instruction. Generally, the module 116 acquires a series of video frames for processing, whereby the frames include a first image frame including the intersection before a stop line (or crossroad) and a second, subsequent image frame including an area located within/after the intersection. Embodiments are contemplated, however, which process multiple video frames included in a sequence having the scene of interest in the image plane. Generally, this video data is assumed to capture the activity of a candidate violating vehicle.

Because the video camera is likely mounted at a fixed location, the stop signal used for guiding traffic at the intersection-of-interest is known at the time of camera set-up. In response to the stop signal being a traffic light, the signal status detection module 118 determines a color of a signal lamp displayed on the traffic light at S406. This determination at S406 is performed for each image frame being processed in the video sequence.

Figure 5:
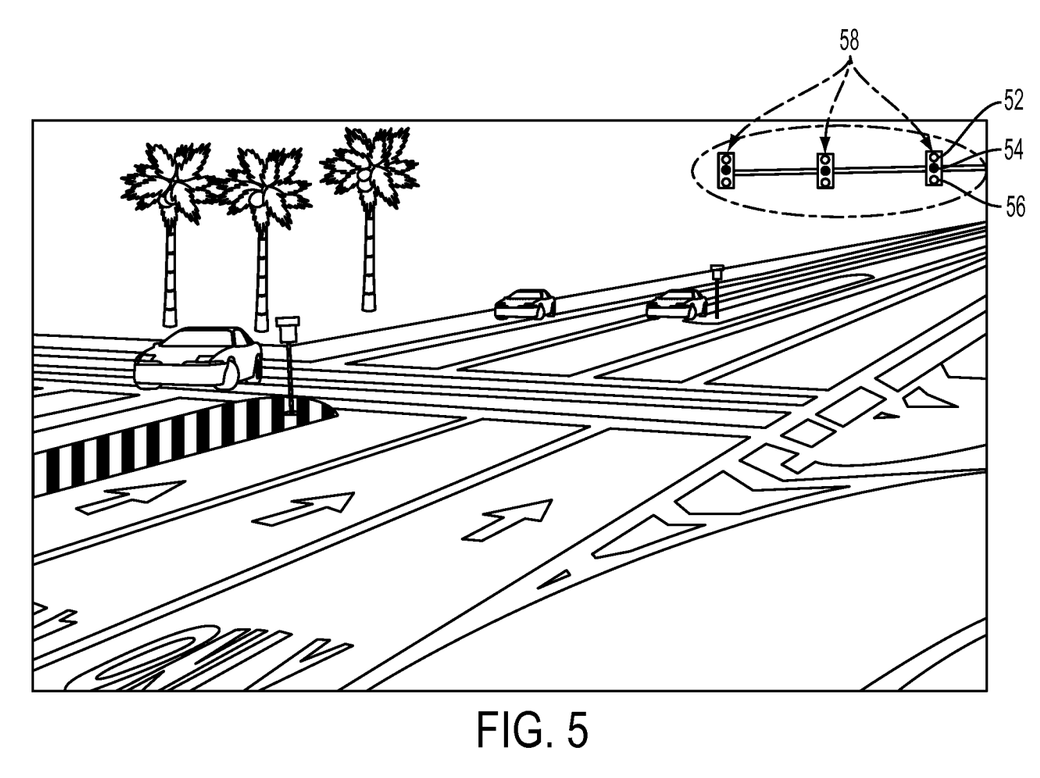
FIG. 5 is an illustrative image frame showing example ROIs defined on the image plane and each corresponding to a signal lamp on the traffic light guiding traffic moving through the scene of interest.

For illustrative purposes, the disclosure assumes that the traffic light can display one of red, yellow, and green. To determine the color of the signal lamp, the module 118 defines at least one region of interest ($ROI_{SL}$) in each frame including a location of a signal lamp on the image plane at S408. In one embodiment, separate ROIs can be defined for each signal lamp located on the traffic light. FIG. 5 is an illustrative image frame showing example ROIs defined on the image plane and each corresponding to a signal lamp on the traffic light guiding traffic moving through the scene of interest. FIG. 5 more specifically shows $ROI_R$ 52 for a red signal lamp, $ROI_Y$ 54 for a yellow signal lamp and $ROI_L$ 56 for a green signal lamp. Furthermore, FIG. 5 illustrates that multiple traffic signals 58 can be located in the scene; separate ROIs can be defined for the lamps corresponding to each traffic signal.

Usually, only one signal lamp is illuminated at a time, although there are scenarios where two lamps can be illuminated. For example, a red lamp can stop traffic in one direction while a green arrow allows traffic to travel in another direction without conflicting traffic. The present disclosure is contemplated to include computer algorithms that can distinguish between two simultaneously illuminated lamps.

Returning to FIG. 4A, the state of the traffic light(s) can be estimated by calculating a measure of intensity $I_R$, $I_Y$, and $I_G$ for pixels respectively located at $ROI_R$, $ROI_Y$, $ROI_G$ associated with the signal lamp at S410. The module 118 can compute these intensities from either one of a color and gray-scale version of each video frame. More specifically, in one embodiment, the measure of intensity can include the average intensity values $I_R$, $I_Y$, and $I_G$ for pixels in each $ROI_R$, $ROI_Y$, $ROI_G$. In another embodiment, the measure of intensity can include the median intensity values $I_R$, $I_Y$, and $I_G$ for pixels in each $ROI_R$, $ROI_Y$, $ROI_G$. Next, in response to multiple ROIs being processed, the module 118 compares the intensities $I_R$, $I_Y$, and $I_G$ against one another at S412. The module 118 determines the $ROI_R$, $ROI_Y$, $ROI_G$ having the highest measured intensity $I_R$, $I_Y$, and $I_G$ at S414. The signal lamp corresponding to the determined $ROI_R$, $ROI_Y$, $ROI_G$ with the highest intensity is identified at S416. The traffic light color is then classified for the frame being processed based on the identified signal lamp at S418. Generally, the color is known at the time each ROI is identified during the video camera set-up and/or calibration.

Mainly, the present system discriminates between violating vehicles that run a red light and/or stop signal and non-violating vehicles that abruptly stop. Therefore, the frames-of-interest in the sequence are the ones that show a red traffic light. Therefore, the module 118 determines if the traffic light is red at S420. In response to the traffic light color not being red (NO at S420), the frame can be discarded at S422 to reduce the computational load. However, as mentioned supra, embodiments are contemplated where the video buffer module 116 acquires video streams including only frames when the signal light is red, such as when the video camera, in communication with a traffic light controller, is operative to capture the video only when the traffic light is red. In these embodiments, the system can omit the signal lamp color determination at S406.

Figure 6:
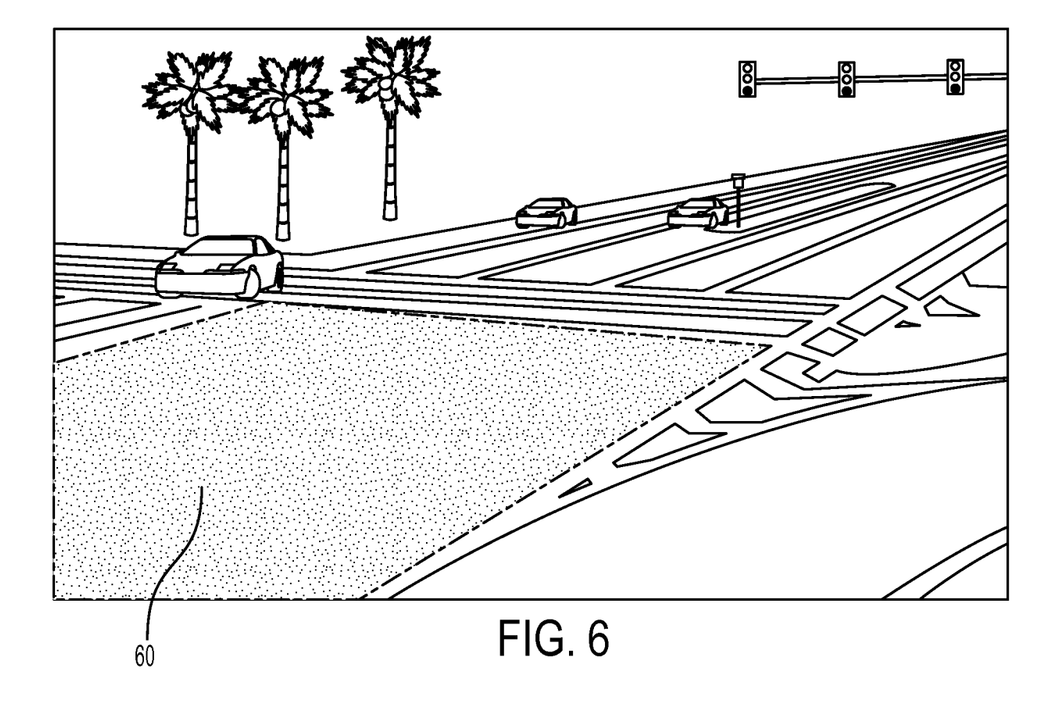
FIG. 6 is an illustrative image frame showing an example ROI defined on the image plane corresponding to the road portion located before the intersection.

In response to the traffic light color being red in the frame (YES at S420), the object detection module 120 defines a region of interest $ROI_B$ including a road region located before the intersection on the image plane at S424. FIG. 6 is an illustrative image frame showing an example $ROI_B$ 60 defined on the image plane corresponding to the road portion located before the intersection. The $ROI_B$ can be defined manually via input for one frame, and the module 118 determines the location of the $ROI_B$ identified by the user for each subsequent frame. For example, the user can point to the $ROI_B$ in the given frame using an input device of the GUI 134. However, there is no limitation made herein to how the $ROI_B$ is defined.

The object detection module 120 searches the defined $ROI_B$ for foreground objects at S426. Foreground objects can be detected using motion-based methods that use temporal properties of a video sequence or detection may be performed using still-image-based methods.

Foreground object detection via motion in video can be achieved via a number of different methods. Two common methods of moving object detection used in applications that perform analytics on video data include background estimation and subtraction and motion detection within an ROI. These methods use spatial information available in the video frames and typically exploit temporal differences and similarities between the frames to detection moving objects.

Because the present system endeavors to identify violating vehicles that run a red light, the selected operation does not require a detection of stationary objects. Therefore, any known motion detection approach can be used to search $ROI_B$ for moving objects ("motion detected regions"). A frame differencing approach can be used to identify the motion detected regions within the camera field of view by computing pixel-wise differences between successive frames in the video stream. By thresholding these differences, areas containing the moving objects can be easily identified. Example approaches for extracting the motion detected regions can include pixel-level optical flow methods or a block-matching algorithm.

Alternatively, model-based approaches for motion/foreground detection can be used. In one embodiment, the system 100 performs the background subtraction approach. The background subtraction approach detects foreground objects rather than moving objects. However, moving objects also trigger foreground detection because their appearance differs from the background estimate. For example, when an image of the background, without any foreground objects, is available, a model is trained to estimate common pixel values. Mainly, background subtraction computes the absolute intensity/color difference between the known or estimated background model and each current frame in the video sequence. By comparing each current frame to the background model, the pixels of which the computed distance in the intensity/color space does not meet a predetermined threshold value are classified as background pixels and the pixels of which the computed distance in the intensity/color space meets and exceeds the threshold (i.e., do not fit the existing background model) are classified as foreground pixels. The detected foreground pixels indicate a foreground object/motion detected region.

Strategies used to maintain a background model or estimate include a historical statistical model (e.g., a parametric descriptor density model, such as, Gaussian Mixture Models (GMM) based approach or a non-parametric descriptor density model, such as, a kernel-based estimate) for each pixel is constructed, eigenbackgrounds (which use principal component analysis), computation of running averages (that gradually update the background after each next frame), and median filtering, etc. The background models are typically adjusted dynamically to account for slow variations in the background of the scene. In the contemplated embodiment, the background estimate can be continuously updated with each incoming frame at a rate controlled by a predetermined learning rate factor. However, embodiments are contemplated where the background estimate can be updated at slower rates. Other alternatives are also contemplated for constructing the current background model.

A binary mask/difference image (i.e., a foreground object mask) is generated using the pixel classifications. In one embodiment, a morphological operation that is understood in the art can be applied to the difference image to filter out sources of fictitious motion and to accurately detect pixels associated with foreground or moving objects. An example filtering technique can include applying dilation and closing operations to fill in holes in the binary mask and to bridge small gaps in regions where an object has been erroneously split into a number of smaller, separate foreground elements. Connected component analysis (CCA), morphological opening, or morphological erosion can also be used to eliminate small, extraneous regions where motion is detected in the binary mask. These motion detected regions can result from foreground objects that are too small to be of interest (e.g., a bird flying through the scene) or from general image noise. Common features used in the CCA screening are object area, angle of orientation, and fill density.

However, embodiments are contemplated herein that use still-image-based methods, where the still image data may be acquired as individual frames of a video sequence, or from a still image camera, such as a still image camera used for evidentiary photographs. In these embodiments, the foreground object detection can search the images for features—such as texture, structure, and color, etc.—commonly associated with vehicles.

At S428, the module 120 associates each detected object/motion detected region with a candidate violating vehicle. The module 120 may detect foreground pixels corresponding to the same object/motion region in multiple frames. For example, a candidate violating vehicle approaching a traffic signal may exhibit different motion in distinct and separated time segments. The candidate violating vehicle can stop at the red light, check the intersection, and then move again (through the red light) when the intersection is free. This behavior is not common, but does occur when drivers grow impatient at long lights, such as, for example, when a demand-actuated traffic sensor fails to trigger a green light change. In scenarios where the candidate violating vehicle exhibits different motion patterns across the scene, the vehicle can be erroneously associated with multiple, different trackers for the two separated time segments containing its motion.

Continuing at FIG. 4B, to avoid "multiple sightings" of the same vehicle from being treated as multiple candidate violating vehicles, the tracker assignment module 121 can confirm that only one tracker is assigned to each detected candidate violating vehicle at S430. By managing the tracker assignments, the module 121 essentially prevents multiple trackers from being assigned to the same candidate violating vehicle detected over multiple frames. One aspect of this validation procedure is that it can reduce the computational load needed in the tracking stage. Another aspect of this validation procedure is that it can reduce the number of erroneous violation detections.

The module 121 extracts a feature descriptor for each candidate violating vehicle at S432. Because the system applies one tracking algorithm in the contemplated embodiment, the feature descriptor corresponds with the selected tracking approach.

Example tracking algorithms contemplated herein include region-based tracking algorithms and point trackers. Examples of region-based tracking algorithms can include mean shift and particle filtering. Example descriptors that can be extracted for the region-based tracking algorithms include attributes-such as color histograms and/or histograms of oriented gradients, etc.-and the distance of the detected motion region to each currently tracked subject. Mainly, these tracking algorithms consider the entire motion detected region. An example of a point tracker is KLT tracking. Example descriptors that can be extracted for point trackers include a set of features from the motion detected region or a number of currently tracked features in the motion detected region. Mainly, point trackers consider sets of localized entries, such as hard edges, corners, and interest points of the candidate subject (foreground object).

The module 121 compares each feature descriptor to one of a predetermined threshold and currently tracked descriptor at S434. Based on the comparison, the module 121 classifies each candidate violating vehicle as belonging to one of a new candidate violating vehicle and a currently tracked candidate violating vehicle at S436.

For region-based tracking algorithms, if the extracted feature descriptor is an attribute of the candidate violating vehicle, the attribute is compared with the attributes of currently tracked candidates. In response to the attributes of the motion detected region not matching the attributes of any currently tracked candidate, the module 121 classifies the candidate violating vehicle as belonging to a new candidate violating vehicle. In response to the attributes of the motion detected region matching the attributes of a currently tracked candidate, the module 121 classifies the candidate violating vehicle as belonging to a currently tracked candidate.

If the extracted feature descriptor is the computed distance between the motion detected region and each currently tracked candidate violating vehicle on the image plane, the computed distance is compared to a predetermined distance threshold. In response to the computed distance meeting and exceeding the predetermined threshold, the module 121 classifies the candidate violating vehicle as belonging to a new candidate violating vehicle. In response to the computed distance not meeting the predetermined threshold, the module 121 classifies the candidate violating vehicle as belonging to a currently tracked candidate.

For point trackers, if the extracted feature descriptor is a set of features from the motion detected region, the set of features is compared to the sets of features of currently tracked subjects. The number of matching features is counted. In response to the number of features not meeting a predetermined threshold number, the module 121 classifies the candidate violating vehicle as belonging to a new candidate violating vehicle. In response to the number of features meeting and exceeding the predetermined threshold number, the module 121 classifies the candidate violating vehicle as belonging to a currently tracked candidate.

Similarly, if the extracted feature descriptor includes a number of currently tracked features in the motion detected region, this number is compared to a predetermined threshold. In response to the number of currently tracked features not meeting a predetermined threshold number, the module 121 classifies the candidate violating vehicle as belonging to a new candidate violating vehicle. In response to the number of currently tracked features meeting and exceeding the predetermined threshold number, the module 121 classifies the candidate violating vehicle as belonging to a currently tracked candidate. The logic behind this approach is that when the vehicle being tracked is moving, the motion detected blob will overlap with the tracked vehicle and will contain a set of features already being tracked.

In response to the candidate violating vehicle being classified as belonging to a currently tracked candidate, the module 121 abandons new independent tracking of this candidate violating vehicle at S438. However, the tracker assignment module 121 assigns a tracker to each new candidate violating vehicle at S440. More specifically, the module 121 assigns the feature descriptor (attributes or features) extracted at S432 to the tracker. However, for embodiments that omit the validation procedure (S430-S436), a feature descriptor is extracted for each newly detected candidate violating vehicle. As mentioned supra, the descriptor can be based on the tracking algorithm later applied by the system. For example, if a point tracker such as KLT is applied, then the extracted features can be selected from a group consisting: scale-invariant feature transform (SIFT) features; speeded-up robust features (SURF); interesting points such as Harris corners, fast accelerated segment test (FAST), or minimum eigenvalue algorithm features; and maximally stable extremal region (MSER) features. Likewise, if a region-based tracker such as mean-shift or particle filtering is to be used, then the extracted features can include color attributes of the object region, such as a color histogram or other color statistics extracted from the object region; geometric attributes from the detected object, such as orientation, aspect ratio, and eccentricity, etc.; and, shape attributes from the detected region, such as a histogram of oriented gradients, a histogram of edges, and corners, etc.

The extracted feature descriptor (hereafter "features") is transmitted to the vehicle tracking module 122, which tracks the extracted features across subsequent frames in the video stream at S442. The tracking algorithm used by the module 122 processes features that are consistent with the ones extracted by the previous module 121. As mentioned supra, the module 122 can apply one of a number of different tracking approaches including, but not limited to mean-shift tracking, contour tacking, Kalman filtering, KLT tracking, and particle filtering, etc. Generally, the module 122 determines the location of each tracked subject across subsequent frames using the trackers. The module 122 anticipates that the subjects move with the road direction in the scene, and the locations therefore change over time. For each frame that a candidate violating vehicle remains within the video camera (or combined cameras) field of view, the module 122 generates tracking data describing the location of the candidate violating in pixel coordinates at S444.

As mentioned supra at S422, the system can discard frames that do not correspond to a 'red' traffic light. However, for embodiments that omit this step, the vehicle detection and modules 120-122 can perform the tracking operation across the sequence of frames only including the 'red' traffic light and stop the tracking operation when the traffic light is not 'red'.

Figure 7:
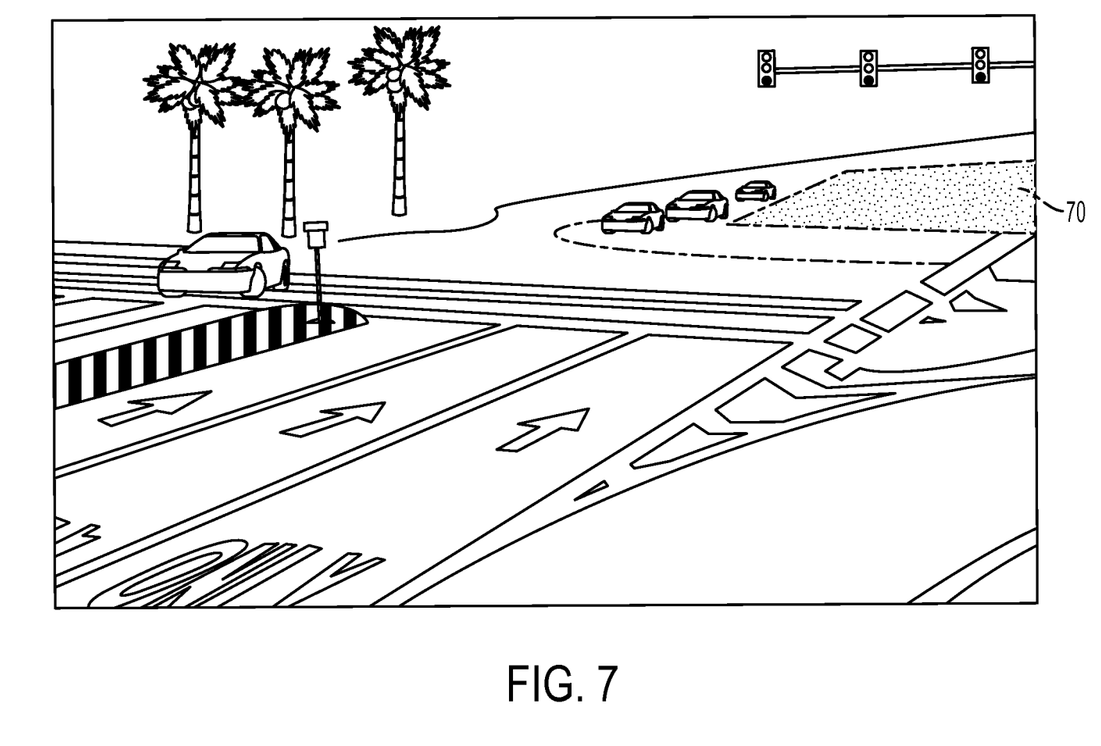
FIG. 7 is an illustrative image frame showing an example ROI defined on the image plane corresponding to the road portion located after the stop signal.

The tracking module 122 transmits the tracking data/location information to the violation determination module 124. For a given frame, the violation determination module 124 can define an $ROI_A$ located after the stop signal on the image plane at S446. FIG. 7 is an illustrative image frame showing an example $ROI_A$ 70 defined on the image plane corresponding to the road portion located after the stop signal. Using the location information, the at least one trajectory is generated for the candidate violating vehicle being tracked at S448. Mainly, one trajectory is generated if the tracking module 122 used a region-based tracker to track the candidate vehicle-of-interest. Multiple trajectories—based on the number of features detected for the candidate vehicle—are generated if the tracking module 122 used a point tracker to track the candidate vehicle-of-interest. The trajectories of the tracked features/candidate violating vehicles can be smoothed out to mitigate the impact of outliers. For this purpose, least square estimates or linear/non-linear regression techniques can be used to eliminate the outliers.

The violation determination module 124 determines if the calculated trajectory (or all trajectories for a cluster for point trackers) includes a component in both the $ROI_B$ and $ROI_A$ at S450. In response to the at least one trajectory including a component in both the $ROI_B$ and $ROI_A$ (YES at S450), the candidate violating vehicle is classified as belonging to the violating vehicle at S452. In response to the at least one trajectory not including a component in both the $ROI_B$ and $ROI_A$ (NO at S450), the candidate violating vehicle is classified as belonging to the non-violating vehicle at S454. The violation detection module 124 is interested in the trajectory extending along the road direction between the $ROI_B$ and $ROI_A$. However, other trajectories that are generated using the location information are contemplated. For example, the disclosure contemplates that candidate violating vehicles may turn right while the light is red, as many regulations permit vehicles at to turn right at a traffic light showing a red signal (almost always after a complete stop) when the way is clear. By basing the violation decision on a trajectory component falling within the $ROI_B$, the system prevents these vehicles from being classified as false positives.

The module 124 can use template matching techniques, sparsity based models, or standard machine learning algorithms to analyze the calculated trajectories. The method ends at S456.

One aspect of the present disclosure is a reduction in the number of false positives that generally result from the conventional RLCS enforcement system. Another aspect of the present disclosure is that the system and method employ the existing infrastructure of existing RLCS enforcement systems and can be easily integrated into those existing system.

Although the method 200, 400 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method to detect a vehicle running a stop signal positioned at an intersection, the method comprising:
   acquiring a sequence of frames from at least one video camera monitoring an intersection being signaled by the stop signal;
   defining a first region of interest (ROI) including a road region located before the intersection on the image plane;
   searching the first ROI for a candidate violating vehicle;
   in response to detecting the candidate violating vehicle in the first ROI, tracking a location of the detected candidate violating vehicle across a number of frames;
   generating at least one trajectory using the location in the number of frames;
   defining a second ROI located after the stop signal on the image plane;
   in response to the at least one trajectory including a component in the first and second ROIs, classifying the candidate violating vehicle as belonging to a violating vehicle; and
   in response to the at least one trajectory not including a component in both of the first and second ROIs, classifying the candidate violating vehicle as belonging to a non-violating vehicle based on the at least one trajectory.

2. The method of claim 1 further comprising:
   in response to the stop signal being a traffic light, determining a color of a signal lamp displayed on the traffic light as belonging to one of red, yellow, and green; and,
   classifying the candidate violating vehicle as belonging to one of a violating vehicle and a non-violating vehicle based on the at least one of the trajectory and the color of the signal lamp being red.

3. The method of claim 2, wherein the determining the color of the signal includes:
   defining at least two lamp ROIs in each frame, each lamp ROI including a location of a signal lamp displayed on a traffic light on the image plane;
   calculating a measure of intensity for pixels located at the each signal lamp within the lamp ROIs;
   determining a lamp ROI corresponding to a highest measured intensity;
   identifying the signal lamp corresponding to the determined lamp ROI; and, classifying the displayed traffic light color based on the identified signal lamp.

4. The method of claim 1, wherein the searching the first ROI for the candidate violating vehicle includes:
performing foreground detection within the ROI via one of motion estimation and background estimation with subsequent subtraction.

5. The method of claim 1, wherein the tracking includes:
extracting a set of feature descriptors from pixels corresponding to a region including the detected candidate violating vehicle;
determining if the detected candidate violating vehicle corresponds with one of a tracked vehicle in a previous frame and a new vehicle of interest in a current frame using the extracted set of feature descriptors;
in response to the detected candidate violating vehicle corresponding with the new vehicle of interest, adding the extracted set of feature descriptors to a pool of current feature descriptors; and,
tracking the pool of current feature descriptors across the sequence of frames.

6. The method of claim 5, wherein the feature descriptors are selected from a group consisting of:
color attributes of the region including the detected candidate violating vehicle;
geometric attributes of the detected candidate violating vehicle;
shape attributes extracted from the region including the detected candidate violating vehicle; and,
a combination of the above.

7. The method of claim 5, wherein the determining if the detected candidate violating vehicle corresponds with the tracked vehicle in the previous frame includes:
computing a number of currently tracked features in the region including the detected candidate violating vehicle;
comparing the number of tracked features to a predetermined threshold;
in response to the number of tracked features not meeting and exceeding the predetermined threshold, classifying the detected candidate violating vehicle as belonging to the new vehicle of interest;
in response to the number of tracked features meeting and exceeding the predetermined threshold, classifying the detected candidate violating vehicle as belonging to the tracked vehicle in the previous frame.

8. The method of claim 1, wherein the sequence of frames is acquired from a group consisting of:
video captured in relation to when the candidate violating vehicle triggers a sensor in a road near the first ROI;
video captured in relation to when a red signal light is detected;
video captured in relation to when a signal is transmitted to a signal light for turning the signal light red; and,
a combination of the above.

9. The method of claim 1, wherein the acquiring the sequence of frames includes:
triggering the at least one video camera to capture each sequence of frames only when a signal lamp displayed on the stop signal is red.

10. A system for detecting a vehicle running a stop signal positioned at an intersection, the system comprising a traffic regulation enforcement device including a memory and a processor in communication with the processor configured to:
acquire a sequence of frames from at least one video camera monitoring an intersection being signaled by the stop;
define a first region of interest (ROI) including a road region located before the intersection on the image plane;
search the first ROI for a candidate violating vehicle;
in response to detecting the candidate violating vehicle in the first ROI, track a location of the detected candidate violating vehicle;
generate at least one trajectory using the location in the number of frames;
define a second ROI located after the stop signal on the image plane;
in response to the at least one trajectory including a component in the first and second ROIs, classify the candidate violating vehicle as belonging to a violating vehicle; and
in response to the at least one trajectory not including a component in both of the first and second ROIs, classify the candidate violating vehicle as belonging to a non-violating vehicle based on the at least one trajectory.

11. The system of claim 10, wherein the processor is further configured to:
in response to the stop signal being a traffic light, determine a color of a signal lamp displayed on the traffic light as belonging to one of red, yellow, and green; and,
classify the candidate violating vehicle as belonging to one of a violating vehicle and a non-violating vehicle based on the at least one of the trajectory and the color of the signal lamp being red.

12. The system of claim 11, wherein the processor is further configured to:
define at least two lamp ROIs in each frame, each lamp ROI including a location of a signal lamp displayed on a traffic light on the image plane;
calculate a measure of intensity for pixels located at the each signal lamp within the lamp ROIs;
determine a lamp ROI corresponding to a highest measured intensity;
identify the signal lamp corresponding to the determined lamp ROI; and,
classify the displayed traffic light color based on the identified signal lamp.

13. The system of claim 10, wherein the processor is further configured to:
perform foreground detection within the ROI via one of motion estimation and background estimation with subsequent subtraction.

14. The system of claim 10, wherein the processor is further configured to:
extract a set of feature descriptors from pixels corresponding to a region including the detected candidate violating vehicle;
determine if the detected candidate violating vehicle corresponds with one of a tracked vehicle in a previous frame and a new vehicle of interest in a current frame using the extracted set of feature descriptors;
in response to the detected candidate violating vehicle corresponding with the new vehicle of interest, add the extracted set of feature descriptors to a pool of current feature descriptors; and,
track the pool of current feature descriptors across the sequence of frames.

15. The system of claim 14, wherein the feature descriptors is selected from a group consisting:

color attributes of the region including the detected candidate violating vehicle;
geometric attributes of the detected candidate violating vehicle;
shape attributes extracted from the region including the detected candidate violating vehicle; and,
a combination of the above.

16. The system of claim 14, wherein the processor is further configured to:
compute a number of currently tracked features in the region including the detected candidate violating vehicle;
compare the number of tracked features to a predetermined threshold;
in response to the number of tracked features not meeting and exceeding the predetermined threshold, classify the detected candidate violating vehicle as belonging to the new vehicle of interest;
in response to the number of tracked features meeting and exceeding the predetermined threshold, classify the detected candidate violating vehicle as belonging to the tracked vehicle in the previous frame.

17. The system of claim 10, wherein the processor is further configured to acquire the sequence of frames from a group consisting of:
video captured in relation to when the candidate violating vehicle triggers a sensor in a road near the first ROI;
video captured in relation to when a red signal light is detected;
video captured in relation to when a signal is transmitted to a signal light for turning the signal light red; and,
a combination of the above.

18. The system of claim 10, wherein the processor is further configured to:
trigger the at least one video camera to capture each sequence of frames only when a signal lamp displayed on the stop signal is red.

* * * * *